US007607490B2

(12) United States Patent
Reis

(10) Patent No.: US 7,607,490 B2
(45) Date of Patent: Oct. 27, 2009

(54) PNEUMATIC IMPACT TOOL AND METHOD

(75) Inventor: Thomas Reis, Albig (DE)

(73) Assignee: Netter GmbH (DE)

( * ) Notice: Subject to any disclaimer, the term of this patent is extended or adjusted under 35 U.S.C. 154(b) by 0 days.

(21) Appl. No.: 11/449,206

(22) Filed: Jun. 7, 2006

(65) Prior Publication Data

US 2006/0278415 A1 Dec. 14, 2006

(30) Foreign Application Priority Data

Jun. 9, 2005 (EP) ................................. 05012390

(51) Int. Cl.
*B23Q 5/06* (2006.01)

(52) U.S. Cl. ................................ 173/17; 173/32; 91/39

(58) Field of Classification Search ..................... 173/1, 173/17, 119; 91/39, 433, 468; 227/346; 92/85 R See application file for complete search history.

(56) References Cited

U.S. PATENT DOCUMENTS

| | | | | |
|---|---|---|---|---|
| 964,875 | A | | 7/1910 | Nathorst |
| 1,264,318 | A | * | 4/1918 | McGrath ..................... 91/229 |
| 2,699,224 | A | * | 1/1955 | Schmitz ......................... 96/25 |
| 2,862,475 | A | * | 12/1958 | Kinsman .................... 173/131 |
| 3,365,624 | A | | 1/1968 | Komendera |
| 3,376,790 | A | * | 4/1968 | Matson ........................ 91/234 |
| 3,608,650 | A | * | 9/1971 | Matsusaka .................. 173/114 |
| 3,747,474 | A | * | 7/1973 | Cooper ........................ 91/422 |
| 3,878,902 | A | | 4/1975 | Matsuo |
| 3,913,460 | A | * | 10/1975 | Wright ....................... 92/85 R |
| 4,070,947 | A | | 1/1978 | Crewse |
| 4,563,938 | A | * | 1/1986 | Henriksson .................... 91/25 |
| 4,850,436 | A | | 7/1989 | Onodera |
| 4,996,907 | A | * | 3/1991 | Kroger ........................ 91/433 |
| 5,065,824 | A | * | 11/1991 | Ottestad ..................... 173/206 |
| 5,210,918 | A | * | 5/1993 | Wozniak et al. ............... 29/254 |
| 6,553,889 | B2 | * | 4/2003 | Migliori ...................... 91/394 |

FOREIGN PATENT DOCUMENTS

| | | | |
|---|---|---|---|
| DE | 188566 | | 2/1906 |
| DE | 1728071 | | 2/1972 |
| EP | 1279622 | A1 | 1/2003 |
| EP | 1442999 | A1 | 8/2004 |
| GB | 772 | | 3/1913 |

* cited by examiner

*Primary Examiner*—Rinaldi I. Rada
*Assistant Examiner*—Nathaniel Chukwurah
(74) *Attorney, Agent, or Firm*—Price, Heneveld, Cooper, DeWitt & Litton, LLP

(57) ABSTRACT

A pneumatic impact tool and method includes a cylinder pipe or housing closed with a cover, as well as an impact piston that forms a first pressure chamber between an impact plate and the impact piston, and a second pressure chamber between the cover and the impact piston. The cover is provided with at least one opening, the surface of which is smaller than the piston surface, whereby the impact piston seals the opening when it is in its fully retracted position.

36 Claims, 4 Drawing Sheets

PNEUMATIC IMPACT TOOL AND METHOD

CLAIM OF PRIORITY

Applicant hereby claims the priority benefits under the provisions of 35 U.S.C. § 119, basing said claim of priority on European Patent Application Ser. No. 05 012 390.0, filed Jun. 9, 2005. In accordance with the provisions of 35 U.S.C. § 119 and Rule 55(b), a certified copy of the above-listed European patent application will be filed before the grant of a patent.

BACKGROUND OF THE INVENTION

The invention relates to a pneumatically-operating impact tool and a method for operating a pneumatic impact tool.

Pneumatically-operating impact tools are especially used for dislodging or knocking deposits off a tank wall, or the like. For example, it may be a case of knocking scale or dusty material off a tank wall. Pounding or knocking of this type has proven to be effective and sometimes necessary if the dusty material is not completely dry and also has a tendency to form channels or deposits. By using a forceful impact against the outer wall of the tank, it is possible to loosen and/or release the debris or dusty material and cause it to flow out.

A pneumatically-operating impact tool and a method for operating a pneumatically-operating impact tool are known from DE 38 19 112 A 1. With an impact tool such as this, the impact piston is moved away from the impact plate and/or the tank wall by application of an excess pressure applied to the first pressure chamber and a strong spring that is arranged between the impact piston and the cover which is compressed.

After the switching of a valve assigned to the first cylinder chamber into the vent or ventilating setting, this spring has the task of moving the impact piston abruptly against the impact plate and/or the tank wall and thus causing the impacts. A quick-action ventilating valve arranged in the area of the cover vents the first pressure chamber to the second pressure chamber holding the spring, so that the air leaving the first compression chamber is transferred to the second compression chamber and, with a low force percentage, overcomes the spring force.

With this impact tool, the disadvantage is that the design is very complicated, because the spring has to be positioned between the impact piston and the cover, and a quick-action ventilating valve must be provided and integrated into the cover. Consequently, the manufacturing effort for this impact tool and also the assembly effort are considerable. If it is taken into consideration that hard impact forces are exerted by means of the impact tool, there is an increased susceptibility to malfunction among the large number of individual parts of the impact tool, since each individual component of the impact tool is subject to a high introduction of force and vibratory stresses.

A similarly designed pneumatically-operating impact tool with a spring arranged between the impact piston and the cover is known from DE 38 19 111 A 1.

A pneumatically-operating impact tool with a spring is also described in DE PS 2 49 551. In it, the air channel between the first pressure chamber and the second pressure chamber is guided outside the cylinder pipe.

U.S. Pat. No. 4,070,947 describes a pneumatically-operating impact tool and a method for operating a pneumatically-operating impact tool, in which a cylinder pipe is used to guide an impact piston, whereby the cylinder pipe is closed with a cover, and a pressure chamber is formed between the impact piston and the cover. This cover is provided with an opening that is connected to a compressed air connection. The cover plate has the task of delimiting the pressure chamber and serving as a stop for the impact piston. In its end position, moved away from the impact plate, the impact piston does not seal the opening. The driving of the piston in the direction of the impact plate occurs by opening a valve and thus application of an elevated pressure on the impact piston, and in fact directly with respect to its entire piston surface.

SUMMARY OF THE INVENTION

The object of the present invention is to provide a pneumatically-operating impact tool and a method for operating a pneumatically-operating impact tool, wherein it is ensured that, to carry out the impact process, the impact piston is abruptly exposed to this moving force for stressing the impact piston.

Relating to the pneumatically-operating impact tool, the object is achieved by the characteristics of claims 1 and 2 and, with respect to the method for operating the pneumatic impact tool, by the characteristics of claims 19 and 26.

Thus, the impact piston is moved away from the impact plate, or the tank wall, and/or the object to be impacted, due to the low pressure existing in the first pressure chamber, until it seals at least one opening in the cover. Then the relatively high pressure in the area of the at least one opening in the cover is applied to the partial area of the cross section surface of the impact piston defined by the sealing of impact plate and the cover associated with this opening, which is significantly smaller than the cross section surface of the impact piston that essentially corresponds to the inner cross section surface of the cylinder pipe. As a result, with the relatively high pressure that is present, at first a relatively low force acts on the impact piston. The actuation of the impact piston is triggered either only by this relatively high excess pressure or, advantageously, by the venting of the first pressure chamber. Because of the pressure reduction in the first pressure chamber, the force acting in this area of the impact piston is reduced, so that the high pressure that is present in the second pressure chamber creates an opposing force on the impact piston that is greater than the force that acts on the impact piston due to the pressure present in the first pressure chamber, in spite of the smaller pressure area. As a result, the impact piston is moved out of its sealed position, whereby now the relatively high pressure acts on the entire end surface of the impact piston, so that it is moved abruptly in the direction of the impact plate and/or the tank wall and impacts against it, thereby causing the impact process.

Valves that are assigned to the compressed air connections of the two pressure chambers are controlled in such a way that, upon application of a relatively high excess pressure on the impact piston, the first pressure chamber is vented so that the impact piston does not have to be moved against an elevated pressure in the first pressure chamber. The movement of the impact piston back against the cover occurs by switching the compressed air connection of the first pressure chamber, and especially by venting of the second pressure chamber, whereby a relatively low pressure is applied in the first pressure chamber. This pressure is regulated so that it is only high enough for the impact piston to be driven into the position for sealing the opening in the plate.

If the second pressure chamber is not vented when a high pressure is applied in the first pressure chamber, it is actually a disadvantage that work has to be done to counter the pressure existing in the second pressure chamber. However, it is advantageous if the control effort is clearly simplified because a constant pressure is always present in the second pressure chamber, and the movement of the impact piston occurs only because of the differently controlled pressure in the first pressure chamber. An additional air chamber that is present below the lower surface of the piston also offers the advantage that during impact, not all of the air is driven out of this area of the housing. Because of this, very high pressure cannot build up below the impact piston, and the impact energy is completely utilized when the impact piston meets the impact surface.

The relatively low pressure according to process step "a" of claim 19 is 0.5 to 2.0 bars, and preferably 0.5 to 1.0 bars. The relatively high pressure according to process step "b" of claim 19 is 4.0 to 10.0 bars, preferably 5.0 to 7.0 bars, and especially 6.0 bars.

The method according to the invention makes it possible to implement different construction heights of the impact tool in a simple way. A construction design of the impact tool with a relatively long adjusting path of the impact piston is conceivable.

Especially in impact tools in which a large construction height is acceptable, the method for operating the impact tool can be designed in such a way that the relatively high pressure is not present directly at the opening in the cover, but a pressure reservoir arranged in front of the cover is provided as a third pressure chamber that is connected to the compressed air connection. In this case, a relatively large volume is available in the third pressure chamber with a relatively high pressure for moving the impact piston. On the other hand, the impact tool can be built so that it is very flat or compact. In a case such as this, the third pressure chamber is eliminated. In this case, an adequately sized valve takes over the task of the pressure reservoir.

The impact tool can be designed differently with respect to the at least one opening, especially in the area of the cover. Various openings in the cover can be provided that are sealed by means of the impact piston when it is in its end position moved away from the impact plate or tank wall. However, according to a preferred further development of the impact tool according to the invention, it is provided that the cover has a single central opening that is arranged concentrically to the center longitudinal axis of the cover.

The impact tool according to the invention is characterized by few moving parts. Basically it is only necessary to move the impact piston. When an impact plate is used, the impact plate is preferably mounted in the cylinder pipe so that it can slide in a longitudinal direction. If no impact plate is present, the impact piston thus acts directly on the tank wall, and care must be taken that the first pressure chamber of the impact tool is sealed with respect to the tank wall.

Preferably the pneumatically-operating impact tool is used for knocking deposits off of a tank wall. It is also conceivable to use the impact tool to impact components in order to force them to oscillate. Especially in the latter case, the impact piston is preferably guided out of the housing.

Basically the impact piston can be designed very simply with an essentially flat surface turned toward the cover, which is also designed so that it is flat on this side. At least one opening passes through the cover, so it is only necessary to provide one seal between the cover and the impact piston. This is carried out preferably using elastic seals that are embedded in the impact piston and/or the cover, e.g., by using an O-ring that surrounds the single central opening.

The impact tool can be manufactured especially cost-effectively since it has a very uncomplicated design and individual parts. This can be implemented with no problems with the effectiveness of the impact tool. This means the cylinder pipe is designed with a commercially-available pipe. In the area of its end oriented toward the tank wall, it holds a flange for fastening on the tank. In the inside of the pipe, the impact plate can be mounted. The impact piston is to be designed according to the inner dimension of the commercially-available pipe. The cover is to be designed as a plate-shaped element, in the simplest way with one central opening. The cover can be positioned against a stop in the pipe and fastened axially by means of a locking ring, whereby a gasket is inserted between the cover and the pipe and seals these parts with respect to each other. If necessary, on the side of the cover oriented away from the tank wall, the third pressure chamber can be formed that is closed by means of a cover plate that is connected to the pipe end. This cover plate is provided with the compressed air connection for the relatively high pressure. The pressure connection in the first pressure chamber occurs on the side through a hole in the pipe, whereby in this area, the impact piston is designed so that it runs conically so that upon application of the relatively low pressure, a resulting force component in the longitudinal direction of the pipe results, which is adequate to drive the impact piston away from the impact plate and/or the tank wall, into the sealing position with respect to the opening in the cover.

The valves and pressure regulator necessary to operate the impact tool can be components of the impact tool, thus integrated in it, or be separate from the actual impact tool.

With the impact tool according to the invention and/or the method according to the invention for operating the impact tool, the area ratio of the opposite ends of the impact piston is quite large. Even with minimum sliding distance of the impact piston from its sealed position with respect to the cover, i.e., with formation of a minimal slot at the seal between the impact piston and the cover, the relatively high pressure that is present is effective over the entire cross section surface of the impact piston so that the impact piston is abruptly exposed to the moving force for accelerating the impact piston. In the method according to the invention, the movement of the piston from the sealed position is initiated by venting the first pressure chamber or by increasing the pressure in the opening assigned to the second piston space, until this force is greater than the opposing force that acts on the piston by way of the first pressure chamber. With minimal travel distance of the impact piston, it can be exposed abruptly to the pressure force moving it, since the seal between the impact piston and the cover is eliminated, and as a result, the relatively high pressure present in the second pressure chamber now becomes effective abruptly over the entire cross section surface of the impact piston. In this context, a preferred design of the impact tool provides that the cover and the impact piston have face surfaces that are arranged parallel on the sides oriented toward each other. In addition, the face side of the impact piston oriented toward the cover and/or the face side of the cover oriented toward the impact piston has a seat for a ring gasket. This is especially arranged at a slight distance from the opening and concentrically to it.

The pneumatically-operating impact tool has an especially uncomplicated construction design and is easy to assemble. It consists of only a few components; in addition, the impact tool is not very susceptible to malfunction.

Other characteristics of the invention are shown in the sub-claims, the description of the figures and in the figures themselves, whereby it should be noted that all individual characteristics and all combinations of individual characteristics are significant to the invention.

BRIEF DESCRIPTION OF THE DRAWINGS

In the figures, the invention is shown using various embodiments, without being restricted by them. In the figures.

DETAILED DESCRIPTION OF THE PREFERRED EMBODIMENTS

Figure 2:
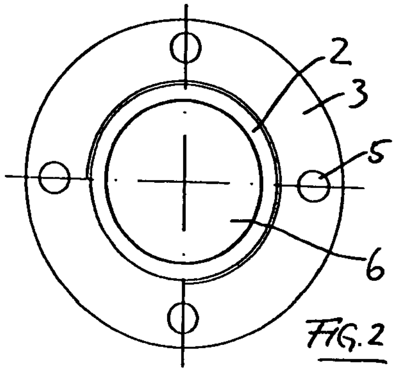
FIG. 2 shows a bottom view of the impact tool shown in FIG. 1.
Figure 1:
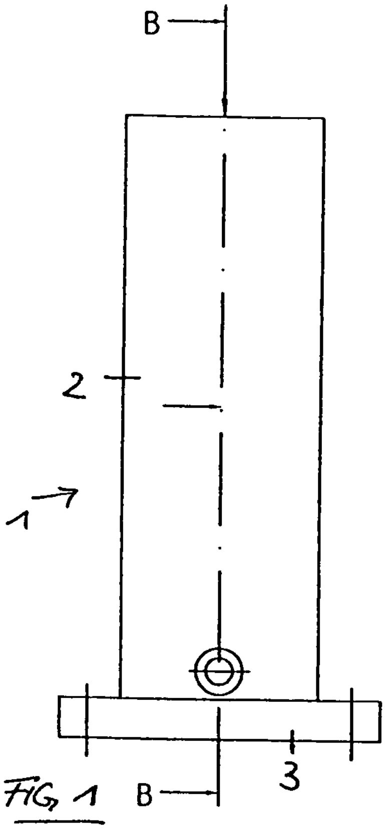
FIG. 1 shows a side view of a first embodiment of the pneumatic impact tool.

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

First reference will be made to the illustrations in FIGS. 1 to 7, with respect to the description of the first embodiment of the pneumatically-operating impact tool 1.

The impact tool 1 is used especially for knocking deposits off a tank wall, or the like. As a central component, it has a cylinder pipe 2 that is designed from commercially-available continuously-cast pipe. In the area of one of its ends, the cylinder pipe is screwed into a fastening flange 3, which is screwed together with the tank wall that is not shown, whereby the surface 4 of the fastening flange 3 contacts the tank wall. The fastening flange 3 has several through holes 5 for the insertion of fastening screws. In the area of the fastening flange 3, the cylinder pipe 2 passes through an impact plate 6 that is sealed by means of a sealing ring 7 with respect to the inner wall 8 of the cylinder pipe 2. The impact plate 6 is thus arranged in the area of the tank wall, and can slide axially in the cylinder pipe 2. On the side of the impact plate 6 oriented away from the tank wall, an impact piston 9 is mounted in cylinder pipe 2, so that it can slide in an axial direction within the cylinder pipe 2. Impact piston 9 has a central cylindrical section 10, a truncated cone section 11 oriented toward the impact plate 6, and a sealing ring 39 that is installed on the side of the cylindrical section 10 oriented away from the impact plate 6 in a seating ring groove 12 in section 10, arranged concentrically to the cylinder pipe axis.

In the end of the cylinder pipe 2 oriented away from the impact plate 6, an intermediate ring is installed that has the function of a cover 15. Cover 15 lies on a recess 16 in the cylinder pipe, and is fastened axially by means of a locking ring 17. A sealing ring 18 seals the plate-shaped cover 15 with respect to the inner wall of the cylinder pipe 2. The cover 15 is provided with an opening 19 that is concentric with respect to the center longitudinal axis of the cylinder pipe 2, which passes through the cover 15.

The diameter of the sealing ring 39 in the cylindrical section 10 of impact piston 9 is slightly larger than the diameter of the opening 19 in cover 15. Cover 15 and the cylindrical section 10 have face walls that are arranged parallel on the sides oriented toward each other. The sealing ring 39 thus seals the impact piston 9 with respect to cover 15 in the immediate area of opening 19. A large surface ratio thus results between the entire surface area of the upper end of impact piston 9 (which is the same as the inner cross-sectional area of cylinder pipe 2) and the surface area of that portion of the upper end of impact piston 9 that is surrounded by sealing ring 39 (which is only slightly larger than the surface area of opening 19).

Figure 4:
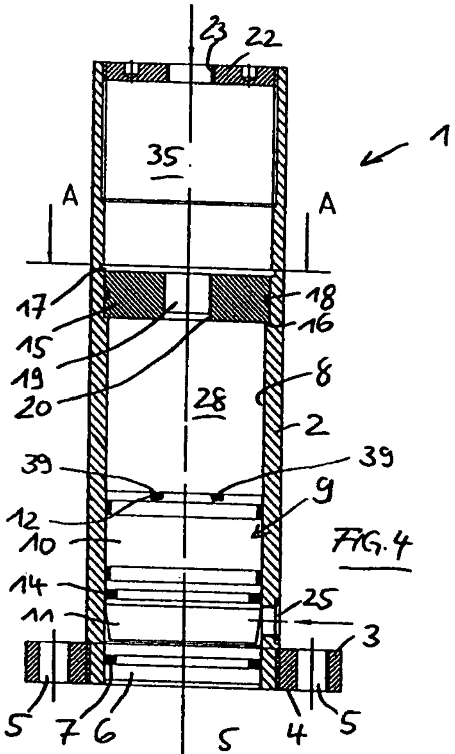
FIG. 4 shows a cross section through the impact tool along line B-B in FIG. 1.
Figure 3:
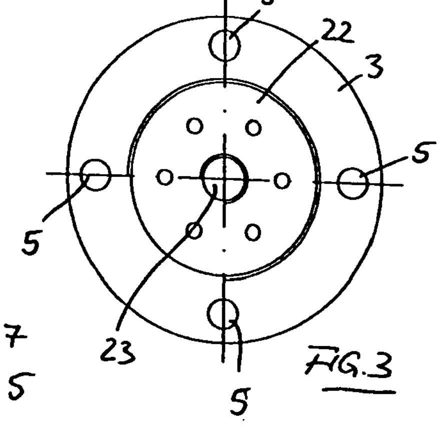
FIG. 3 shows a top view of the impact tool shown in FIG. 1.
Figure 5:
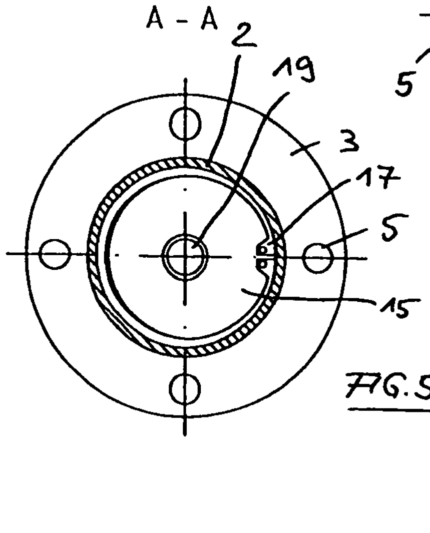
FIG. 5 shows a cross section through the impact tool along line A-A in FIG. 4.

Starting from the surface 4 adjacent to the tank wall, the cover 15 is placed approximately in the transition from the second one-third to the upper one-third of the length of cylinder pipe 2. The end of cylinder pipe 2 oriented away from impact plate 6 is closed by means of another cover that is designated as cover plate 22 to differentiate it. Cover plate 22 is screwed into cylinder pipe 2. The cover plate 22 is provided with a central threaded hole 23 that goes through it to define a compressed air connection 24. In addition, the cylinder pipe 2, adjacent to the fastening flange 3, is provided with a threaded hole 25 that extends radially to define a compressed air connection 26. Hole 25 opens out into the area of the inside of cylinder pipe 2 which, with impact plate 2 lying against the tank wall and on the impact piston 9 lying on the impact plate 6 as shown in FIG. 4, is adjacent the truncated cone-shaped section 11 of the impact piston 9.

Figure 7:
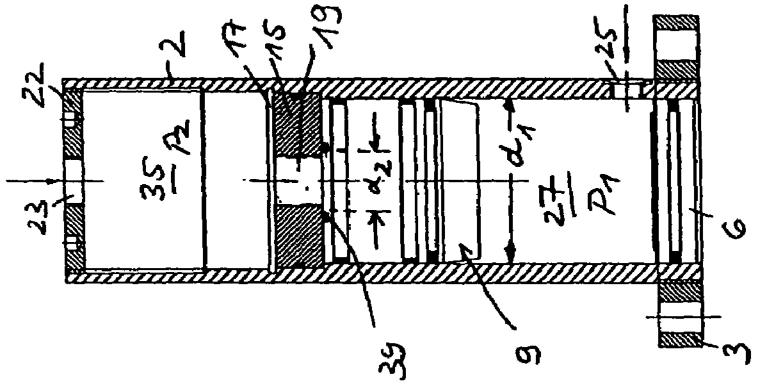
FIG. 7 shows a cross section illustration of the impact tool according to FIG. 6, shown with the impact piston moved against the cover of the central opening, while sealing it.
Figure 6:
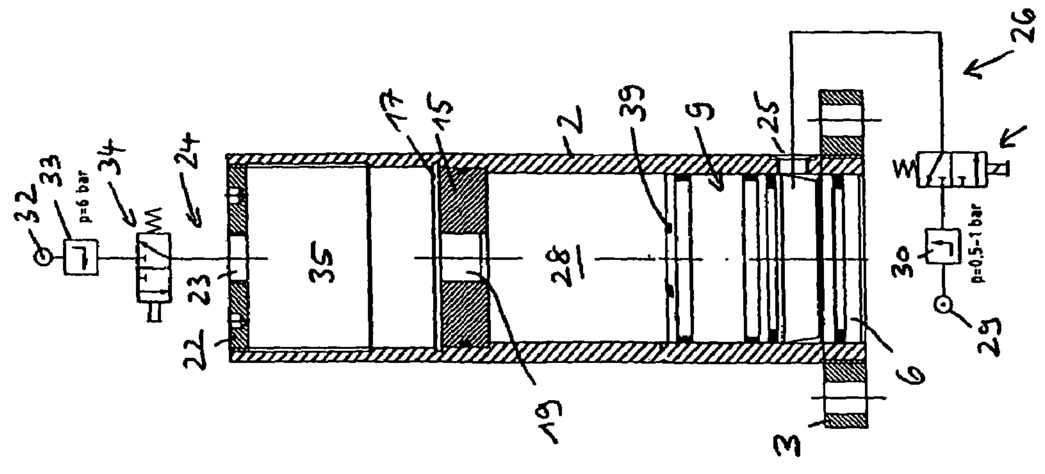
FIG. 6 shows a cross section illustration of the impact tool according to FIG. 4, with the impact piston contacting the impact plate, shown with the valves and pressure regulators of the impact tool.

In the embodiment shown in FIGS. 1 to 7, the threaded hole 25 forms the air inlet for the piston chamber, while in contrast, the threaded hole 23 forms the air inlet for the impact tool pressure reservoir. To this extent, FIG. 6 shows the impact piston 9 in its fully extended position, with contact on the impact plate 6. FIG. 7 shows the impact piston 9 in its fully retracted position, in which its sealing ring lies tightly on cover 15. In the position shown in FIG. 7, a first pressure chamber 27 is formed between the lower end of the impact piston 9 and the impact plate 6. In contrast, with the impact piston 9 in the fully extended position shown in FIG. 6, on the impact plate 6, a second pressure chamber 28 is formed between the upper end of impact piston 9 and the cover 15.

As can be seen with respect to this first embodiment in the illustration in FIG. 6, the compressed air connection 26 has a compressed air source 29, a pressure regulator 30 and a 3/2-way valve 31. The pressure regulator 30 controls the pressure that is present in the first pressure chamber 27 to around 0.5 to 1.0 bars. Similarly, the compressed air connection 24 is provided with a compressed air source 32, a pressure regulator 33 and a 3/2-way valve 34. The pressure regulator 33 controls the pressure that is present in the third pressure chamber 35 formed between the cover 15 and the cover plate 22 to around 6.0 bars.

The pneumatically-operating impact tool 1 that has been explained thus far is operated, for example, as follows:

In a first step, valve 31 is actuated. The impact piston 9 is pressed upward by the air flowing in, with the very low pressure of 0.5 to 1.0 bars. The second pressure chamber 28 and the third pressure chamber 35 are vented at this time.

In a second step, the impact piston 9 has reached its end position, as shown in FIG. 7, and the opening 19 in cover 15 is sealed. The valve 34 is actuated, and the third pressure chamber 35 is put under a pressure of approximately 6.0 bars, depending on the air pressure present in the first pressure chamber 27, and the cross section of the opening 19 in cover 17. During the charging process, valve 31 is still open.

In the third step, valve 31 is vented. The air in the first pressure chamber 27 escapes by way of valve 31. The impact piston 9 moves and, with minimal stroke of impact piston 9, the sealing effect between it and the cover 15 is eliminated. Abruptly, the entire surface area of the upper end of impact piston 9 is now exposed to the air flowing into the second pressure chamber 28, and the impact piston 9 is thereby accelerated with high force. During the impact process the valve 34 should remain open, so that air can still flow.

In the fourth step, valve 34 is closed, and the second pressure chamber 28 and the third pressure chamber 35 are vented. The impact process is ended, and the cycle can begin again.

Valves 31 and 34, as well as the required pressure regulators 30 and 33, can be components of the impact tool 1, i.e., integrated, or be completely separate from the actual impact tool.

Figure 8:
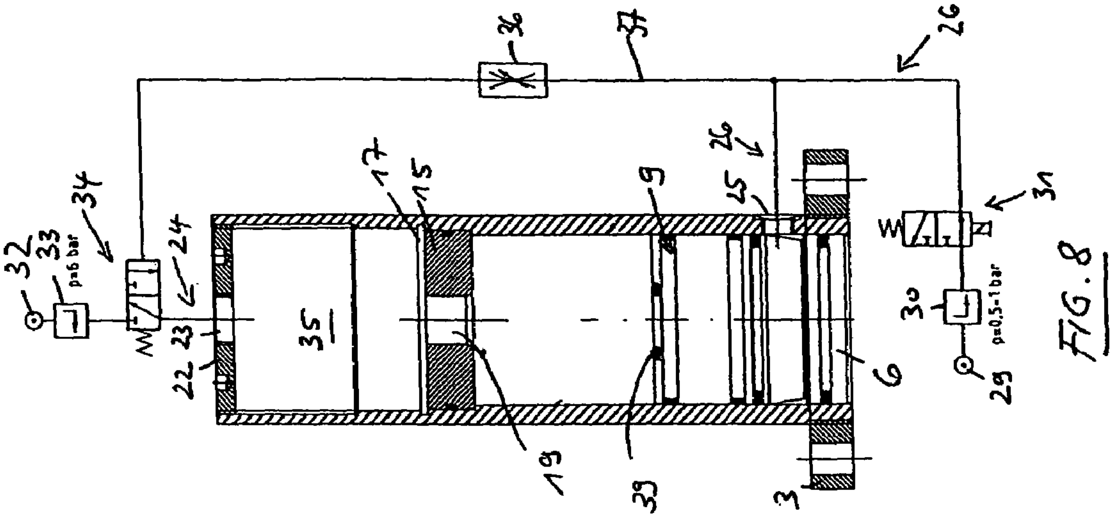
FIG. 8 shows an impact tool in the embodiment according to FIGS. 1 to 7, but in the aspect of FIG. 6 with modified control of the impact tool pressure chambers.

FIG. 8 shows a modified control of the pressure chambers of impact tool 1. The process proceeds basically as described for FIG. 6, but now with automatic actuation of the valve 34. Because of the use of a throttle 36 in a compressed air connection that connects the compressed air connection 37 with the triggering of valve 34, valve 34 is actuated with a time delay. The actuation of valve 34 cannot occur until the impact piston 9 has reached its end position contacting the cover 15. The throttle 36 is thus used for on and off delays in switching valve 34. The components can, as before, be components of the impact tool or also completely separate.

Figure 9:
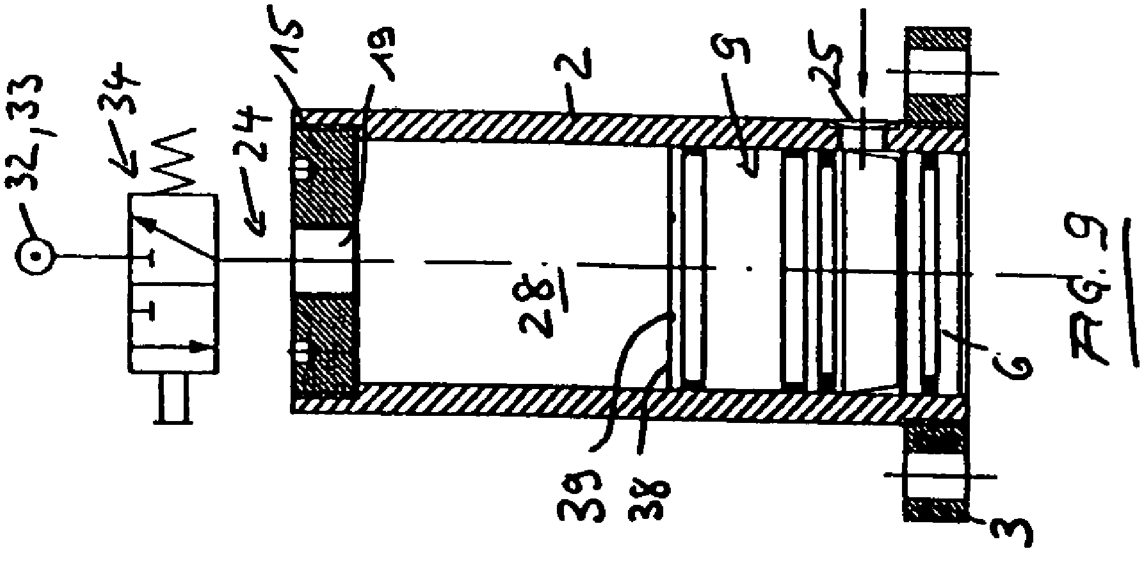
FIG. 9 shows a second embodiment of the impact tool in a cross section illustration according to FIG. 4.

The embodiment according to FIG. 9 is characterized in that the third pressure chamber 35 has been eliminated. The impact tool is constructed more compactly, and consequently, with a shorter cylinder pipe, the end that is oriented away from the fastening flange 3 holds the cover 15 directly. In this case, the third pressure chamber 35 is replaced by the specially dimensioned valve, which in the appropriate switching position, ensures the supply of an adequately large air mass flows into the second pressure chamber 28. In this embodiment, the triggering and control of impact tool 1 occur according to the one in the embodiment according to FIG. 6.

Figure 10:
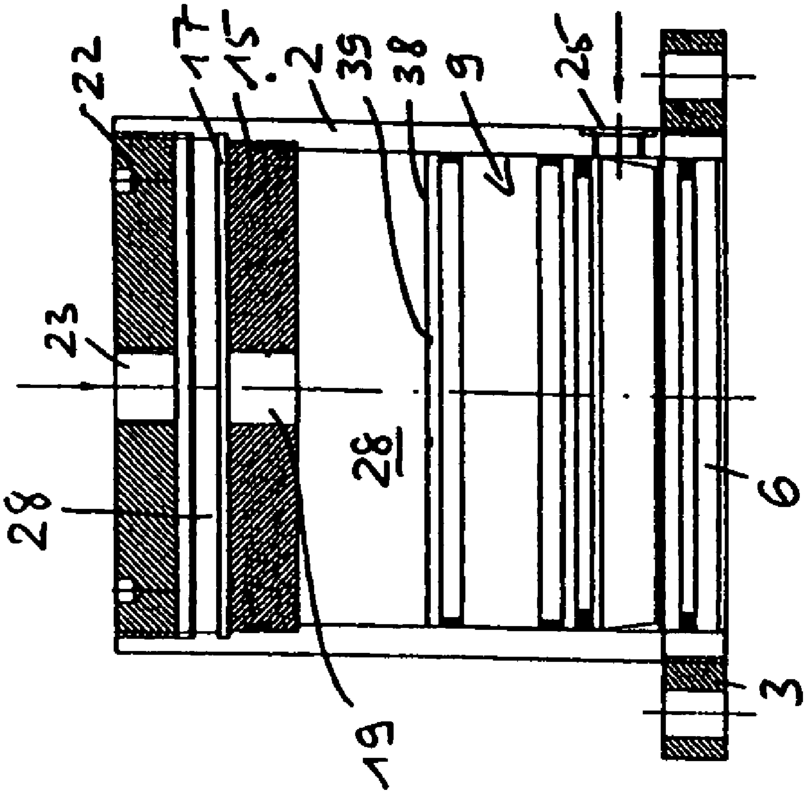
FIG. 10 shows a third embodiment of the impact tool in a cross section illustration according to FIG. 4.

The embodiment according to FIG. 10 is basically designed according to the embodiment in FIGS. 1 to 8, but it is distinguished by a flat construction, i.e., with a further shortened cylinder pipe 2, which in any case has a significantly larger diameter.

The stroke of the impact piston is to be selected according to the dimensions of the impact tool. In one example of the present invention, the stroke is 10.0 to 150.0 millimeters, preferably 30.0 to 80.0 millimeters and especially 50.0 to 60.0 millimeters. The diameter of the piston can vary quite substantially. The smallest variations with a piston diameter of 10.0 millimeters to large variations with a piston diameter of 1.0 meter are conceivable.

Calculation of the pressures in the pressure chambers and of the diameter of the opening in the cover and the entire end surface area of the impact piston can be carried out in a very simple manner under consideration of the physical equations. If the weight of the impact piston is not considered, the following physical relationships in the sense of the inscriptions according to FIG. 7 result for the assumption of a force equilibrium at the piston due to the forces acting in the pressure chamber as a prerequisite to initiate the movement of the impact piston 9 by ventilation of the pressure chamber 27:

$$\frac{d_1}{d_2} = \frac{\sqrt{p_1}}{\sqrt{p_2}}$$

Thus there is a relationship between the variables $d_1$, $d_2$, $p_1$ and $p_2$.

For example, if pressures $p_1$=0.5 bars, $p_2$=6.0 bars and a diameter $d_1$=70.0 millimeters are specified, the diameter $d_2$ must be 20.21 millimeters in order to keep the impact piston 9 in equilibrium. If the first pressure chamber 27 is vented, and thus the pressure $p_1$ drops, a higher force acts on the surface with diameter $d_2$ than on the surface with diameter $d_1$, so the impact piston 9 is moved in the direction of the first pressure chamber 27. Because of the equation above, it is obvious that with specification of three variables, the diameter $d_1$, the pressure $p_1$ or the pressure $p_2$ can be calculated.

Figure 11:
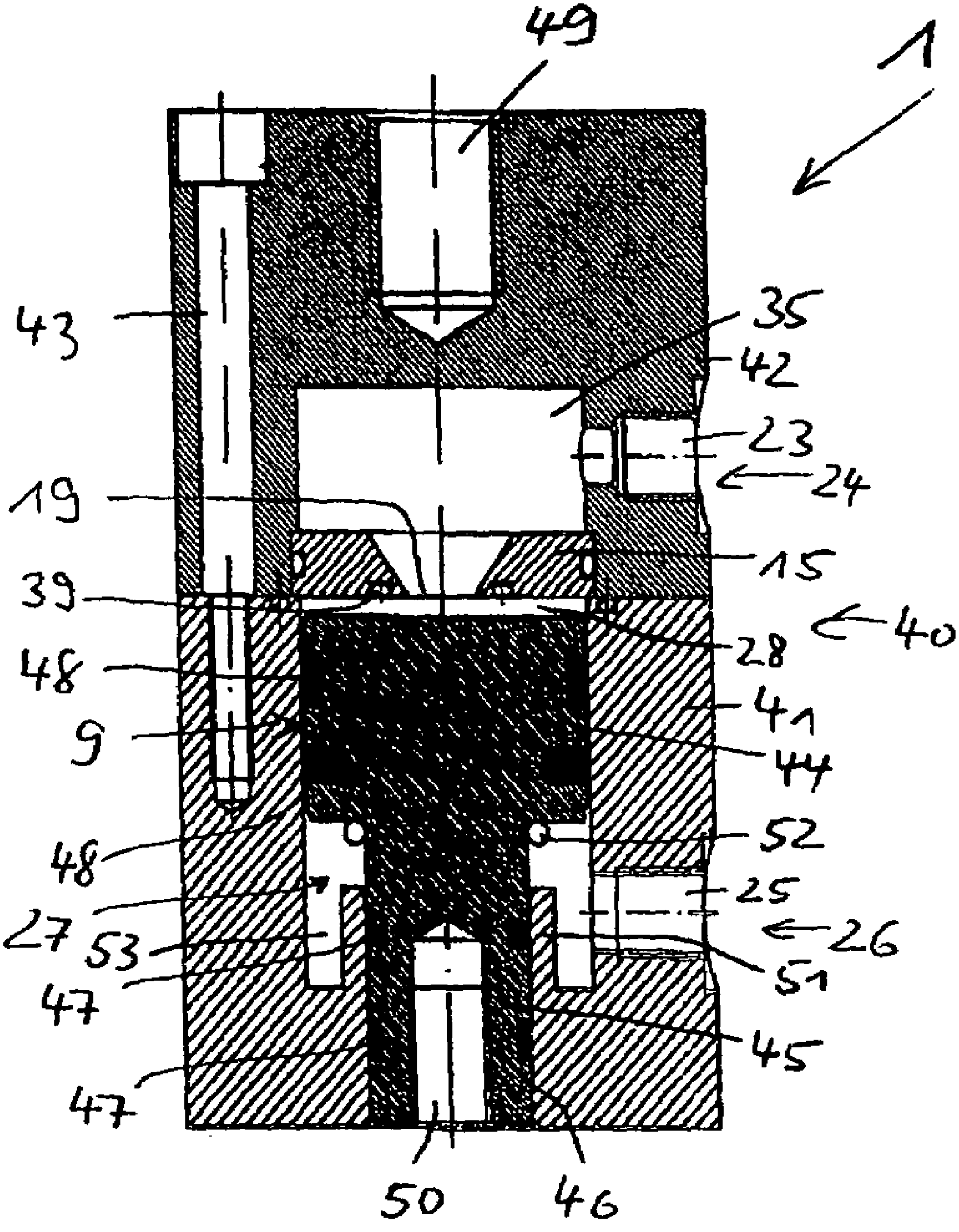
FIG. 11 shows a fourth embodiment of the impact tool in a cross section illustration according to FIG. 4 or FIG. 7.

The embodiment according to FIG. 11 operates according to the same function principle as the one according to FIG. 7. For the sake of simplicity, components in this embodiment that correspond in operation are shown with the same reference numbers in FIG. 11.

In the embodiment according to FIG. 11, the construction arrangement has no cylinder pipe 2 for holding the impact piston 9, but rather a housing 40. This housing 40 consists of the two housing parts 41 and 42 that are screwed to each other by means of several screws 43. In the housing 40, according to the conditions with a cylinder pipe 20, a space is formed for holding the impact piston 9. In a recess of the housing part 42, the cover 15 is mounted. The cover 15 is fastened axially between the two housing parts 41 and 42. In housing part 42, between it and the cover 15, the third pressure chamber 35 is formed; in addition, between the cover 15 and the impact piston 9, the second pressure chamber 28 is formed, and finally between the impact piston 9 and the area of housing part 41 that is oriented away from the cover 15, the first pressure chamber 27 is formed. In contrast to the embodiments that have been described to this point, in the embodiment according to FIG. 11, in addition to the actual piston section 44 that can be brought into an active connection with cover 15, the impact piston has another piston section 45 with a small diameter that passes through an opening 46 in housing part 41 that has a matching diameter so that it seals it. The sealing occurs by means of sealing rings 47. The piston section 44 is also sealed with respect to the housing part 41 by means of sealing rings 48. The cover 15 is provided with the O-ring 39 concentric to the opening 19. The third pressure chamber 35 is provided with the threaded hole 23 for the purpose of compressed air supply, and the pressure chamber 27 is provided with threaded hole 25 for the purpose of compressed air supply. Starting from the pressure chamber 35, the passage 19 in the cover is designed as a conically narrowed, truncated cone.

This above-described embodiment is especially used to impact a component. This means the housing part 42 is provided, in a frame part that is not shown, with a threaded hole 49 for fastening the impact tool. Also the end of the impact piston 9 oriented away from the cover 15 is provided with a threaded hole 50, with which especially a plastic part is connected that is moved against the component during impact. Not only the housing part 41 in the area of the sealing rings 48 is used as a guide for the impact piston 9, but also a ring-shaped projection 51 of the housing part 41. With impact piston 9 moved away from the cover 15, it impacts the component to be impacted with this connected plastic part. If the object is in the area of impact tool 1, to prevent the impact piston from being driven without definition, the projection 51 of the housing part 41 is provided as a stop, whereby a ring-shaped elastic element 42 cushions the movement of the impact piston 9. The pressure chamber 27 contains a ring-shaped air reservoir/residual volume 53. During the movement of the impact piston 9 for the purpose of impact, the air volume in the first pressure chamber 27 decreases, whereby the air escapes by way of hole 25. It has been found that shortly before the impact piston 9 meets the object to be impacted and/or the projection 51, an air cushion is formed on the face side between impact piston 9 and housing part 41. Therefore in this embodiment it is not necessary to remove all of the air out of the first pressure chamber 27; thus residual volume 53 remains.

The impact tool according to the embodiment in FIG. 11 is operated, for example, in such a way that a relatively low pressure is continuously present in pressure chamber 27, which is suitable for pushing the impact piston 9 in the direction of cover 15 as long as a lower pressure is present in pressure chamber 35. For example, the first pressure chamber 27 is continuously stressed with an excess pressure, whereby a value of the excess pressure between 0.5 and 2.0 bars is considered especially suitable. If a relatively high pressure is applied on pressure chamber 35, this leads to the fact that the seal between cover 15 and impact piston 9 will be eliminated in the area of the sealing ring 39, and thus the high pressure will abruptly act on the significantly greater cross section surface of impact piston 9, which corresponds to the diameter of pressure chamber 28. The impact piston 9 is moved further against the pressure that is present, as before, in pressure chamber 27. After the impact process has been carried out, the control reduces the pressure in pressure chamber 35 again, and thus in pressure chamber 28; the impact piston 9 is pushed back against the sealing ring 39 of the cover 15 because of the pressure that is continuously present in pressure chamber 27.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A pneumatic impact tool, comprising:

a cylindrical tube having a hollow interior extending between first and second oppositely disposed ends;

an impact plate slidably mounted in said interior of said tube for reciprocation therein and sealingly closing said first end of said tube interior;

a cover connected with said tube and sealingly closing an outer portion of said tube interior disposed adjacent to said second end thereof;

an impact piston slidably mounted in said interior of said tube for reciprocation therein and having first and second circularly-shaped, oppositely disposed end surfaces defining a first pressure chamber between said impact plate and said first end surface of said impact piston in which compressed air is communicated to shift said impact piston to a fully retracted position, and a second pressure chamber between said cover and said second end surface of said impact piston in which compressed air is communicated to shift said impact piston to a fully extended position;

an opening disposed through said covert, communicating with said second pressure chamber, and defining the sole inlet for said second pressure chamber; said opening having an exterior side thereof communicating with a source of pressurized air, and an interior side thereof with a plan shape and size that is substantially smaller than the plan shape and size of said second end surface of said impact piston; and an annularly-shaped seal mounted on one of said second end surface of said impact piston and said interior side of said opening in said cover in a generally concentric relationship with said opening, whereby in said fully retracted position, said second end surface of said impact piston and said interior side of said opening in said cover axially abut said seal to sealingly close said opening; said seal being shaped geometrically similar to and slightly larger than said interior side of said opening, such that in said fully retracted position, said opening communicates pressurized air to only a relatively small portion of the total area of said second end surface of said impact piston, whereby when the air pressure differential acting on said first and second end surfaces of said impact piston exceeds a predetermined amount, said piston shifts out of axially abutting contact with said seal, thereby communicating the pressurized air with the entire area of said second end surface of said impact piston, and causing the impact piston to shift abruptly and quickly against said impact plate to said fully extended position.

2. An impact tool as set forth in claim 1, wherein:

said opening is defined by a single, centrally disposed aperture through said cover.

3. An impact tool as set forth in claim 2, wherein:

said cover is plate-shaped.

4. An impact tool as set forth in claim 3, wherein:

said seal is positioned on said second end surface of said impact piston for sealing engagement about said opening in said cover.

5. An impact tool as set forth in claim 4, wherein:

said first and second end surfaces of said impact piston include planar surfaces disposed in a generally mutually parallel relationship.

6. An impact tool as set forth in claim 5, wherein:

said tube includes an attachment flange for connecting said tube to an associated tank wall.

7. An impact tool as set forth in claim 6, wherein:

said tube is constructed from commercially-available pipe.

8. An impact tool as set forth in claim 7, wherein:

said first pressure chamber is configured to include a residual volume.

9. An impact tool as set forth in claim 1, wherein:

said opening is defined by a single central aperture through said cover.

10. An impact tool as set forth in claim 1, wherein:

said cover is plate-shaped.

11. An impact tool as set forth in claim 1, wherein:

said first and second end surfaces of said impact piston include planar surfaces disposed in a generally mutually parallel relationship.

12. An impact tool as set forth in claim 1, wherein:

said second end surface of said impact piston includes an outwardly protruding rim on which said seal is supported.

13. An impact tool as set forth in claim 1, including:

a cover plate connected with said tube and sealingly closing said second end surface of said tube interior to define a third pressure chamber between said cover plate and said cover; said cover plate including a compressed air connection therethrough.

14. An impact tool as set forth in claim 1, wherein:

said tube includes an attachment flange for connecting said tube to an associated tank wall.

15. An impact tool as set forth in claim 1, wherein:

said tube is constructed from commercially-available pipe.

16. An impact tool as set forth in claim 1, wherein:

said first pressure chamber is configured to include a residual volume.

17. A pneumatic impact tool, comprising:

a housing having a hollow cylindrical interior extending between oppositely disposed first and second end portions of said housing;

a cover connected with said housing and sealingly closing said second end portion of said housing interior;

an impact piston having first and second, circularly-shaped, oppositely disposed end surfaces, being slidably mounted in said interior of said housing for reciprocation therein between fully extended and fully retracted positions, and sealingly closing off said second end portion of said housing interior to define a first pressure chamber disposed between said housing and said first end surface of said impact piston and communicating with a first compressed air connection, and a second pressure chamber disposed between said cover and said second end surface of said impact piston and communicating with a second compressed air connection;

an opening disposed through said cover, communicating with said second pressure chamber, and defining the sole inlet for said second pressure chamber; said opening having an exterior side thereof communicating with said second compressed air connection, and an interior side thereof with a plan shape and size that is substantially smaller than the plan shape and size of said second end surface of said impact piston; and an annularly-shaped seal mounted on one of said second end surface of said impact piston and said interior side of said opening in said cover in a generally concentric relationship with said cover, whereby in said fully retracted position, said second end surface of said impact piston and said interior side of said opening in said cover axially abut said seal to sealingly close said opening; said seal being shaped geometrically similar to and slightly larger than said interior side of said opening, such that in said fully retracted position, said opening communicates pressurized air to only a relatively small portion of the total area of said second end surface of said impact piston, whereby when the air pressure differential acting on said first and second end surfaces of said impact piston exceeds a predetermined amount, said piston shifts out of axially abutting contact with said seal, thereby communicating the pressurized air with the entire area of said second end surface of said impact piston, and causing the impact piston to shift abruptly and quickly to said fully extended position.

18. An impact tool as set forth in claim 17, wherein:

said opening is defined by a single, centrally disposed aperture through said cover.

19. An impact tool as set forth in claim 18, wherein:

said cover is plate-shaped.

20. An impact tool as set forth in claim 19, wherein:

said seal is positioned on said cover for sealing engagement with said second end surface of said impact piston about said opening.

21. An impact tool as set forth in claim 20, wherein:

said first and second end surfaces of said impact piston include planar surfaces disposed in a generally mutually parallel relationship.

22. An impact tool as set forth in claim 21, wherein:

said first pressure chamber is configured to include a residual volume.

23. An impact tool as set forth in claim 17, wherein:

said opening is defined by a single central aperture through said cover.

24. An impact tool as set forth in claim 17, wherein:

said cover is plate-shaped.

25. An impact tool as set forth in claim 17, wherein:

said seal is positioned on said cover for sealing engagement with said second end of said impact piston about said opening.

26. An impact tool as set forth in claim 17, wherein:

said first and second ends of said impact piston include planar surfaces disposed in a generally mutually parallel relationship.

27. An impact tool as set forth in claim 17, wherein:

said first pressure chamber is configured to include a residual volume.

28. A pneumatic impact tool, comprising:

a cylindrical tube having a hollow interior extending between first and second oppositely disposed ends;

a cover connected with said tube and sealingly closing an outer portion of said tube interior disposed adjacent to said second end thereof;

an impact piston slidably mounted in said interior of said tube for reciprocation therein and sealingly closing said first end of said tube interior; said impact piston having first and second circularly-shaped, oppositely disposed end surfaces defining a first pressure chamber between an adjacent tank wall and said first end surface of said impact piston in which compressed air is communicated to shift said impact piston to a fully retracted position, and a second pressure chamber between said cover and said second end surface of said impact piston in which compressed air is communicated to shift said impact piston to a fully extended position;

said first end surface of said impact piston is configured to abuttingly impact the adjacent tank wall;

an opening disposed through said cover, communicating with said second pressure chamber, and defining the sole inlet for said second pressure chamber; said opening having an exterior side thereof communicating with a source of pressurized air, and an interior side thereof with a plan shape and size that is substantially smaller than the plan shape and size of said second end surface of said impact piston; and an annularly-shaped seal mounted on one of said second end surface of said impact piston and said interior side of said opening in said cover in a generally concentric relationship with said opening, whereby in said fully retracted position, said second end surface of said impact piston and said interior side of said opening in said cover axially abut said seal to sealingly close said opening; said seal being shaped geometrically similar to and slightly larger than said interior side of said opening, such that in said fully retracted position, said opening communicates pressurized air to only a relatively small portion of the total area of said second end surface of said impact piston, whereby when the air pressure differential acting on, said first and second end surfaces of said impact piston exceeds a predetermined amount, said piston shifts out of axially abutting contact with said seal, thereby communicating the pressurized air with the entire area of said second end surface of said impact piston, and causing the impact piston to shift abruptly and quickly against the adjacent tank wall to said fully extended position.

29. An impact tool as set forth in claim 28, wherein:

said opening is defined by a single, centrally disposed aperture through said cover.

30. An impact tool as set forth in claim 28, wherein:

said cover is plate-shaped.

31. An impact tool as set forth in claim 28, wherein:

said first and second end surfaces of said impact piston include planar surfaces disposed in a generally mutually parallel relationship.

32. An impact tool as set forth in claim 28, wherein:

said second end surface of said impact piston includes an outwardly protruding rim on which said seal is supported.

33. An impact tool as set forth in claim 28, including:

a cover plate connected with said tube and sealingly closing said second end surface of said tube interior to define a third pressure chamber between said cover plate and said cover; said cover plate including a compressed air connection therethrough.

34. An impact tool as set forth in claim 28, wherein:

said tube includes an attachment flange for connecting said tube to an associated tank wall.

35. An impact tool as set forth in claim 28, wherein:

said tube is constructed from commercially-available pipe.

36. An impact tool as set forth in claim 28, wherein: said first pressure chamber is configured to include a residual volume.

* * * * *

UNITED STATES PATENT AND TRADEMARK OFFICE

CERTIFICATE OF CORRECTION

PATENT NO. : 7,607,490 B2
APPLICATION NO. : 11/449206
DATED : October 27, 2009
INVENTOR(S) : Thomas Reis It is certified that error appears in the above-identified patent and that said Letters Patent is hereby corrected as shown below:

Column 10, claim 1, line 12;
"covert" should be --cover--.

Column 13, claim 28, line 10;
"acting on, said" should be --acting on said--.

Signed and Sealed this

Eighteenth Day of May, 2010

David J. Kappos
*Director of the United States Patent and Trademark Office*